Aug. 15, 1967 B. J. WARMAN ETAL 3,336,507

REED RELAY SWITCHING SYSTEMS

Filed April 12, 1966 10 Sheets-Sheet 3

REED RELAY SWITCHING SYSTEMS

Filed April 12, 1966

United States Patent Office 3,336,507

Patented Aug. 15, 1967

3,336,507

REED RELAY SWITCHING SYSTEMS

Bloomfield James Warman, Charlton, London, and Raymond John Frederick Derbyshire, Welling, Kent, England, assignors to Associated Electrical Industries Limited, London, England, a British company Filed Apr. 12, 1966, Ser. No. 542,165
Claims priority, application Great Britain, Apr. 13, 1965, 15,790/65
11 Claims. (Cl. 317—99)

This invention relates to reed relay switching systems comprising assemblies of reed relays together with associated electrical circuitry. By a reed relay is meant a relay comprising one or more sealed magnetic reed contact units assembled parallel to the magnetic axis of an actuating coil and usually but not necessarily within the coil; depending on the function required to be performed by such a relay it may include an additional coil or coils and/or one or more permanent magnets disposed parallel to one or more contact units of the relay.

The invention has an important application, for instance, in telephone switching systems of the co-ordinate or cross-point kind employing reed relays at the switching cross-points and also elsewhere in the system for performing various switching functions. The number of reed relays required in such a system can be very large and an object of the invention is to enable such large numbers of reed relays together with associated electrical circuitry to be mounted in a compact manner on a structure which can be made to a standard design able to accommodate the relays and circuitry in various combinations according to the requirements of the system.

According to the invention as basically conceived there is provided for such a reed relay switching system an assembly of reed relays and associated electrical circuit components jointly provided in and by an assembled plurality of modules of different types all physically compatible with each other and all based on a common dimensional modulus irrespective of the type of each module, namely whether a relay type module containing reed relay components alone, a circuit type module containing electrical circuit components alone, or a combinational type of module containing a combination of reed relay and circuit components. Each type of module may itself be provided in various forms; for instance as will appear hereinafter a relay module may provide a single relay with four reed contact units each having normally-open contacts ("make" unit), or two such units each having normally-closed contacts ("break" action), or two separate relays with their own coils and contact units, whereas a circuit module may contain components constituting a gating circuit, or part of a counting circuit, and so on.

By basing modules of different type on a common modulus (rather than determining the module dimensions independently for each type) it becomes possible to assemble and mount the modulus in standard frameworks which in turn can be mounted in standard racks: it also becomes possible to mix various types and varieties of modules in individual assemblies at will. Consequently there is the possibility of building up systems which differ in size, circuit design or ancillary facilities while at the same time retaining a large measure of mounting standardisation, with consequent convenience and economic advantage.

With a view to permitting various forms of the different types of module to be build up, as regards body structure, from body parts made in a relatively small variety of different shapes at least some of which can be used for more than one form of body structure, it is further contemplated, as an extension of the basic conception of the invention, to provide for the building up of various module forms a set of body parts comprising relay body parts having respective hollow bobbin portions between integral end cheek portions for accommodating reed contact units within a suroundin coil, the end cheek portions of some of these parts constituting integral end cheeks having dimensions of unit modular length in both directions, spacer end cheek portions of unit modular length or a multiple thereof and of effective width a simple unit fraction of this unit length, the end cheek portions of others of said relay body parts having a dimension in one direction which is a multiple of said unit fraction but less than unit length, frame body parts comprising spaced side legs joining end cheek portions of unit modular dimension in the direction in which said legs are spaced apart and of effective width equal to said unit fraction or a multiple thereof not more than half unit length, said parts permitting the construction of modules with differing body structures by selection and assembly of appropriate parts which, in the case of parts having end cheek portions of fractional modular dimension in one direction can be fitted together so that their end cheek portions together constitute composite end cheeks of unit dimension in that direction, and end plate parts of unit modular dimensions able to be fitted onto the outsides of said integral and composite end cheeks of the body structures, said end plate parts and end cheeks having openings through which projecting terminal connections from components within the completed modules can pass.

The accompanying drawings illustrate various forms of module and of module body parts which can be used in building up assemblies of reed relays and associated circuitry. Also included in the drawings are illustrations of the manner in which the modules can be assembled together in matrix-like rows and columns and mounted in support frames to constitute different parts of a particular design of reed relay telephone switching system. In particular:

Figures 5, 5A:
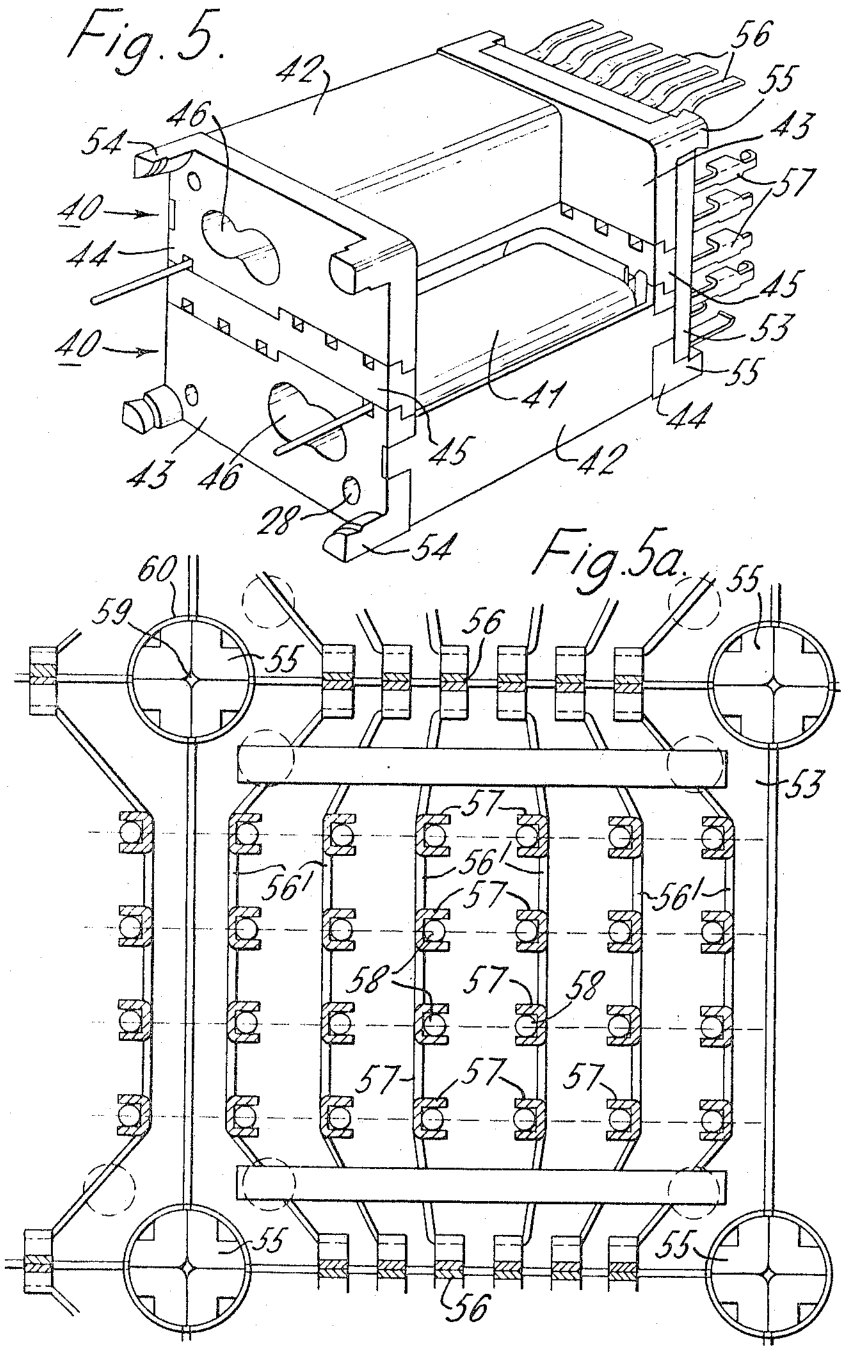
FIGS. 5, 8 and 10 illustrate other forms of reed relay module.
Figures 8, 10:
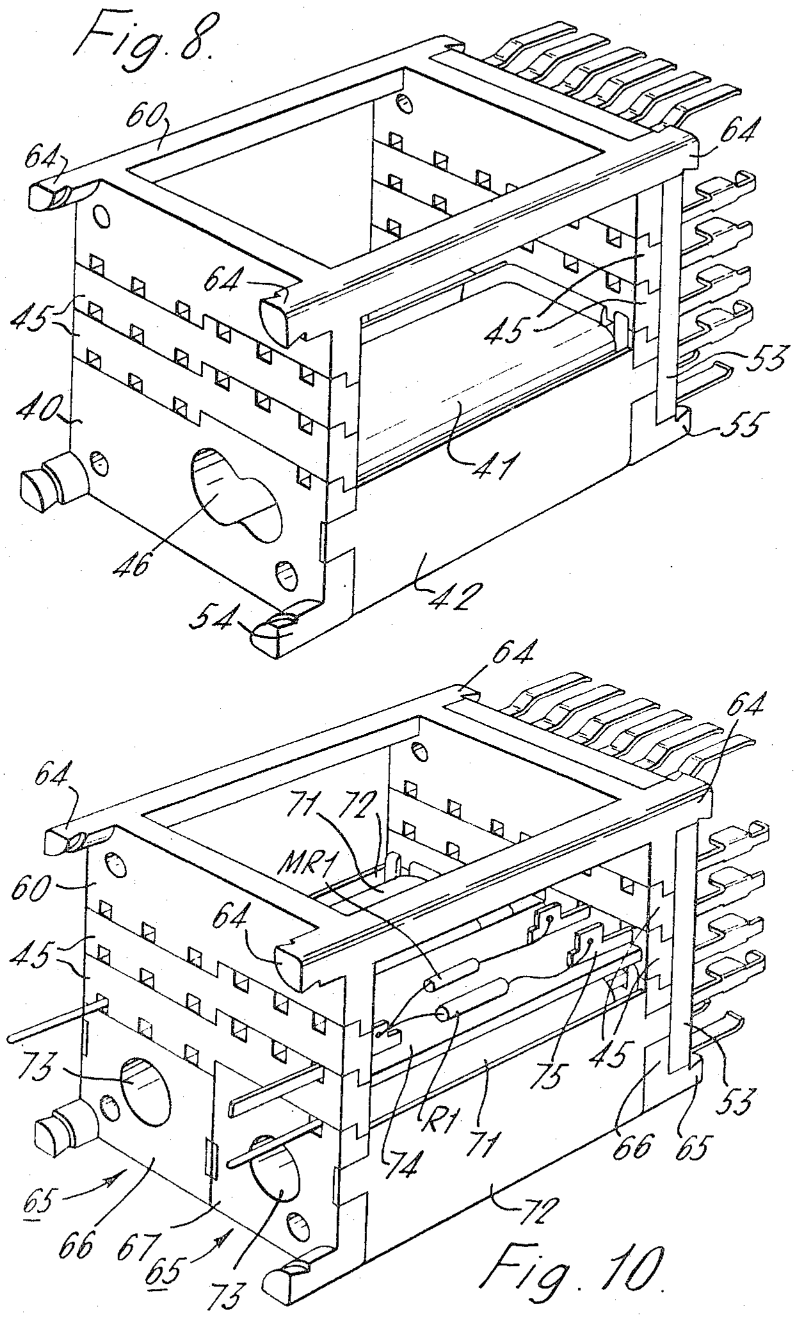

FIG. 5*a* shows an end view of a module and also illustrates the manner in which the modules can be assembled together;

FIGS. 6, 7, 9 and 11 illustrate various component parts from which the modules of FIGS. 5, 8 and 10 can be built up.

Figures 6, 7, 9, 11, 15:
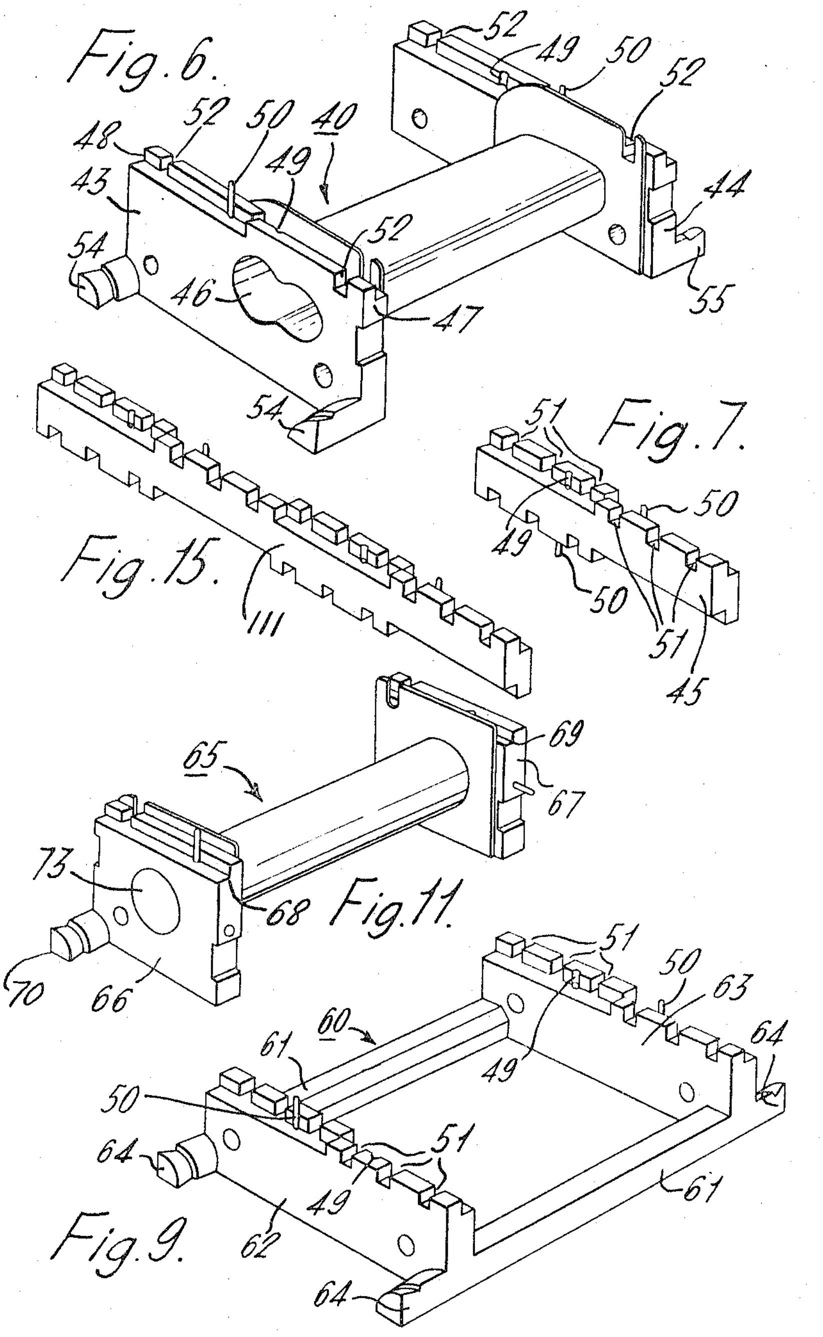
Figure 12:
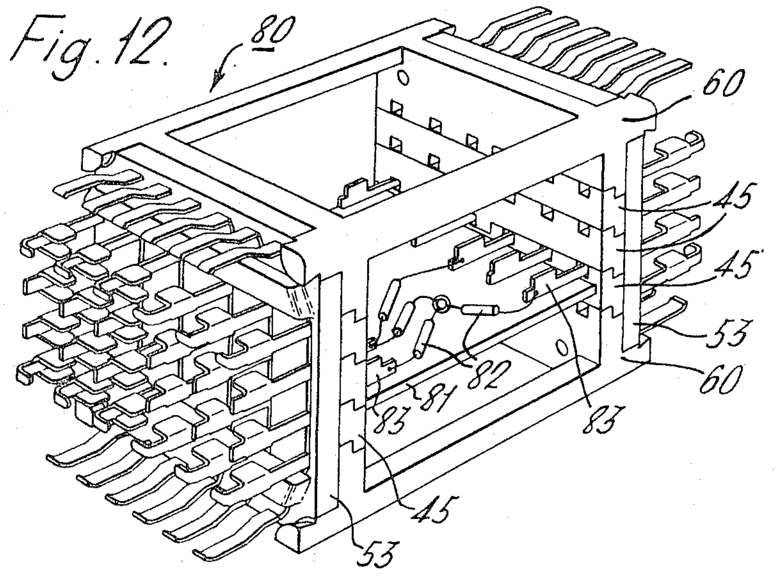
Figure 13:
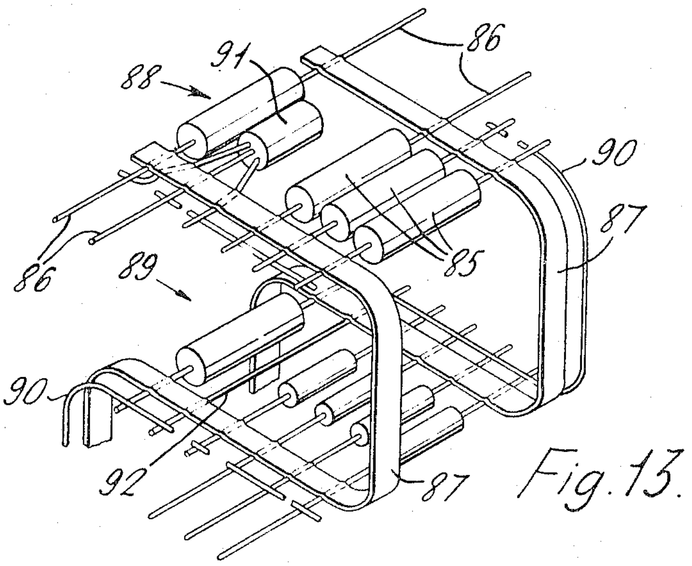
Figure 16:
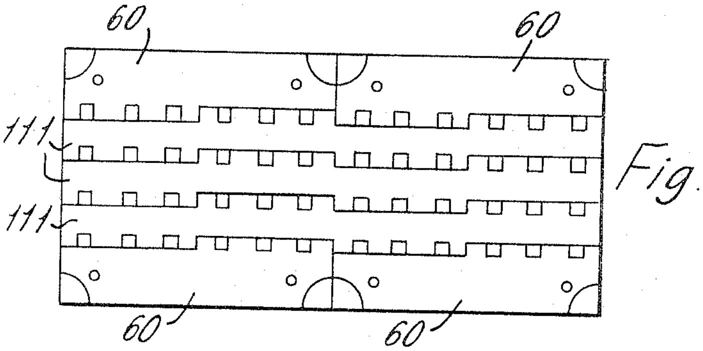
Figure 17:
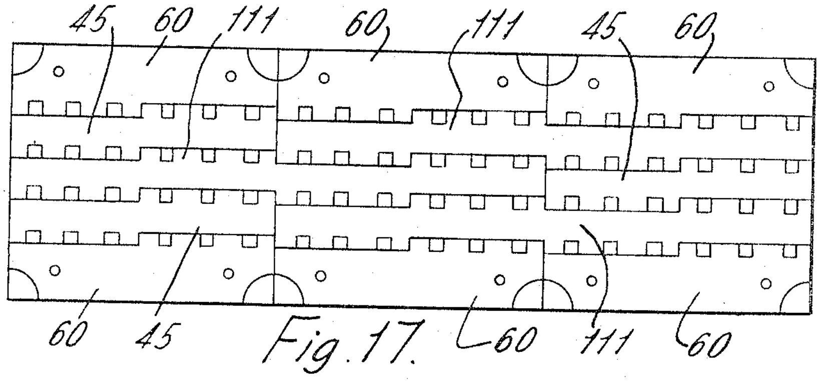
Figure 14:
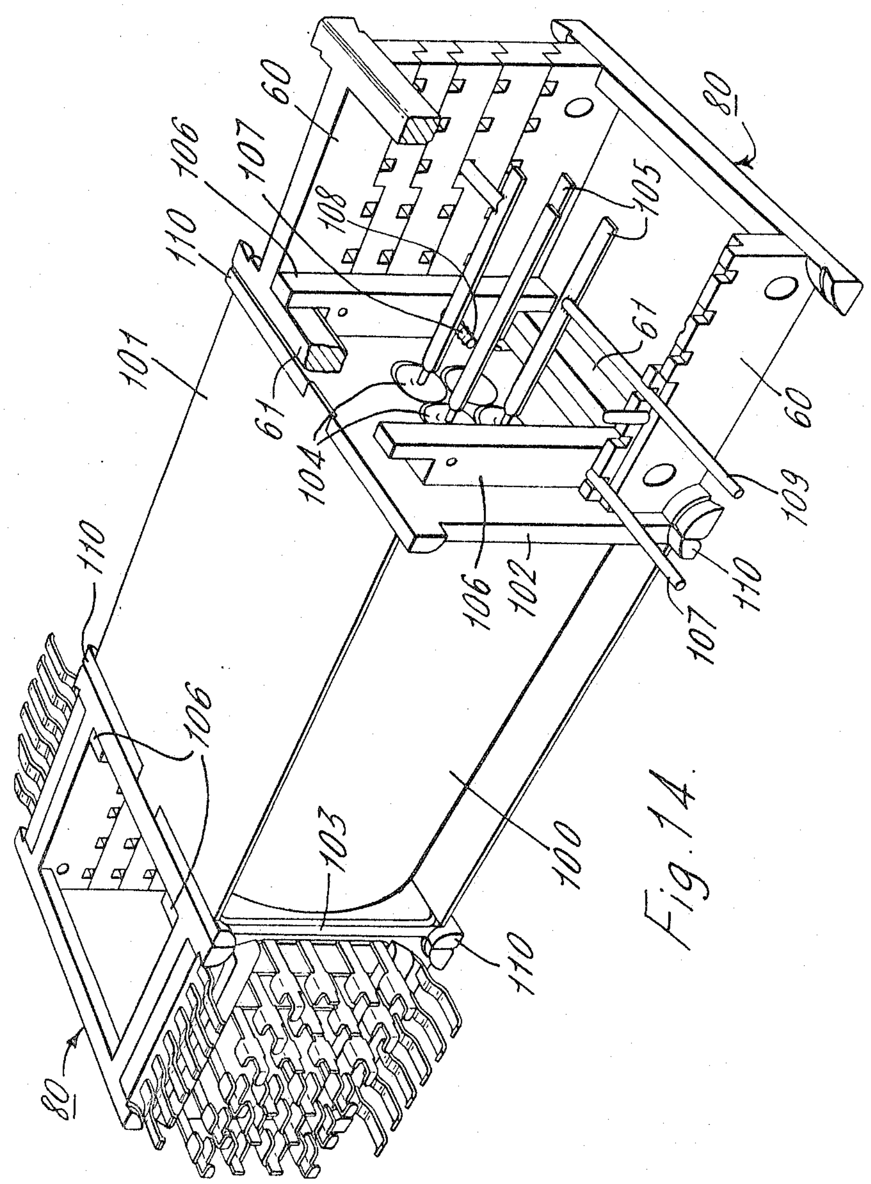
Figure 18:
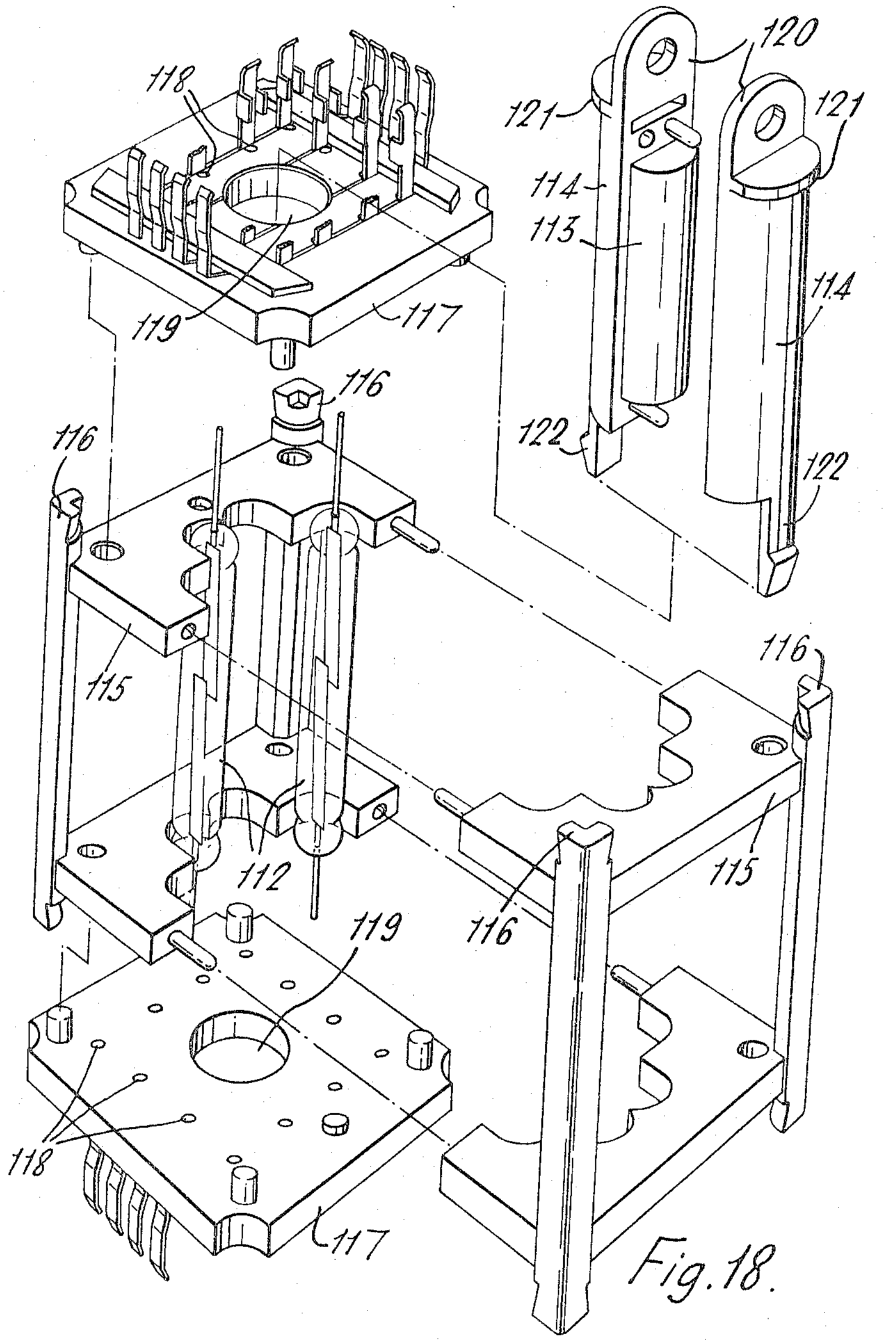

FIG. 12 illustrates a circuit module built up from the parts shown in FIGS. 7 and 9;

FIG. 13 illustrates a circuit sub-assembly such as can be accommodated in the module of FIG. 12;

FIG. 14 illustrates an adaptation of a larger size of reed relay to render it compatible with the other modules;

FIGS. 15, 16 and 17 illustrates the building-up of multiple-width modules;

FIG. 18 illustrates another form of module, and

Figure 19:
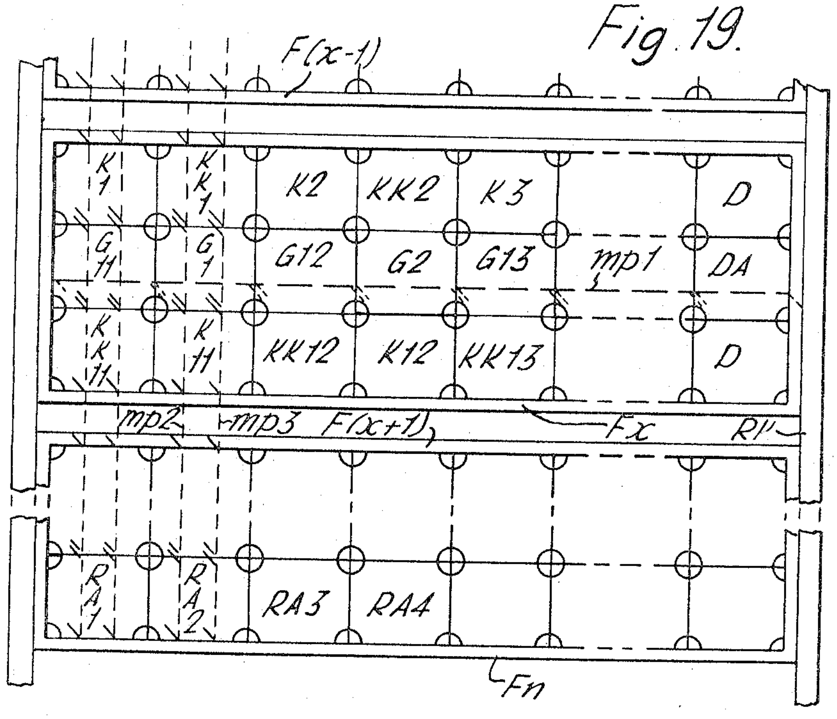

FIG. 19 illustrates one example of an assembly of modules of differing types and varieties.

Figure 1:
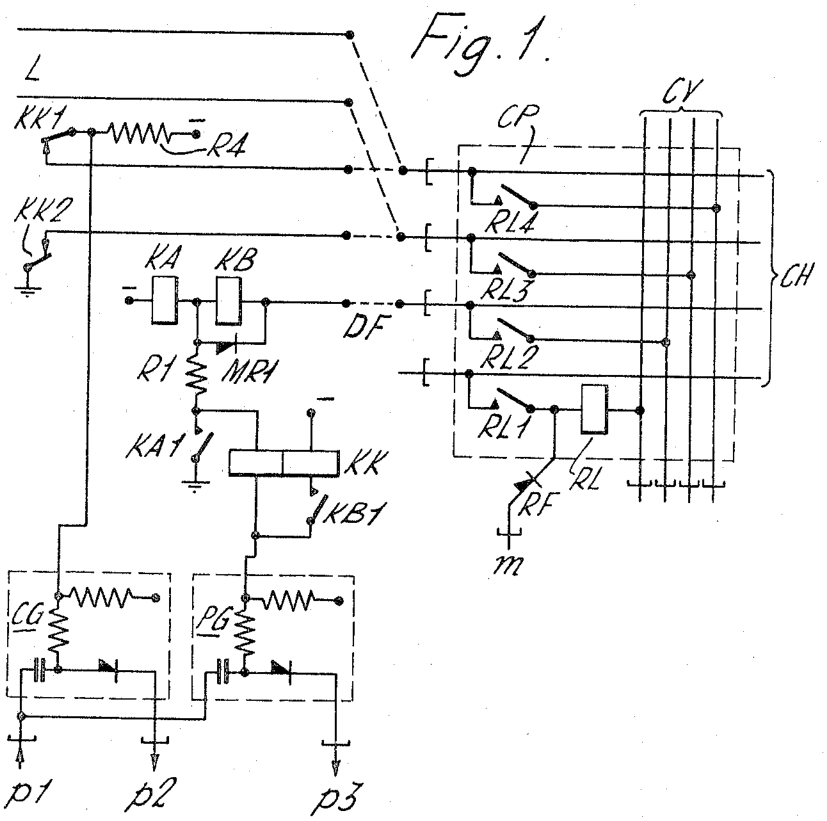
FIGS. 1 and 2 are circuit diagrams of reed relay circuits which can with advantage be provided in modular form in accordance with the invention.

FIG. 1 shows a typical part of a telephone switching system of the cross-point kind employing reed relays for the cross-point switching and also in the line circuits associated with subscribers' lines connected to the system. Each subscriber's line such as L is connected, over a distribution frame DF, to the first of a series of cross-point switching stages over which connection to other lines can be selectively established in well known manner by the operation of the relays at appropriate cross-points. A typical cross-point is shown at CP and comprises a relay (in the present invention a reed relay) having four normally-open (make) contact pairs RL1–RL4 which when operated establish connection between the two sets of co-ordinate multiples CH and CV defining the cross-point. The relays at the requisite cross-points in the switching stages are assumed to be selectively operable under the control of a marker in the manner described in our U.S. Patent No. 3,129,293, issued April 14, 1964. The manner of operation is of no concern in the present case, which concerns only the physical construction and arrangement of the components involved. Consequently the operation need not be here described and it is sufficient simply to note that at each cross-point such as typified by CP the operating coil RL of the cross-point relay is connected in series with one of its contact pairs (RL1) and a marking connection *m* including a rectifier RF is connected to the junction between the relay coil and contacts.

Connected to each line such as L, again over the distribution frame DF, is an individual line circuit constituted as described in our copending U.S. application Ser. No. 467,934 filed June 29, 1965. Here again the mode of operation is not relevant and need not be described. It is sufficient to note that the line circuit includes the following items namely: two relays KA and KB each with a single normally-open (make) contact pair KA1 and KB1 respectively; a resistor R1 and rectifier MR1 associated with the relays KA1 and KB1; a two-coil relay KK with two normally-closed (break) contact pairs KK1 and KK2 and an associated resistor R4; and two pulse-plus-bias gating circuits CG and PG each comprising two resistors, a capacitor and a rectifier as shown. The capacitor branches of these two pulse-plus-bias gates are fed with input pulses over a common input connection *p*1: output pulses from the gates CG and PG are fed over respective output connections *p*2 and *p*3 for separate utilisation in associated control equipment (not shown).

Figure 2:
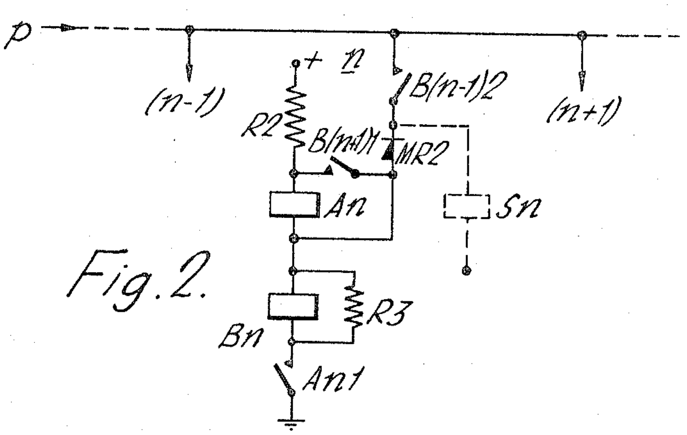

In telephone and other switching systems, pulse-counting circuits may be required in various places and it is contemplated that the present invention may also be applied in relation to such circuits employing reed relays as their active elements. An example is illustrated in FIG. 2, which shows the circuitry for a typical (*n*th) stage of a multi-stage counter constituted by a plurality of such stages connected to a common input line to which pulses to be counted are applied. Each stage comprises two reed relays A and B (typified by A*n* and B*n* for the (*n*th) stage shown in FIG. 2) of which the B relay has a first contact pair B1 connected in the preceding stage (contacts $B(n+1)1$ in stage *n*) and a second contact pair B2 connected in the following stage (contact $B(n-1)2$ in stage *n*). This second contact pair of the B relay, when operated, connects the following stage to the common input line *p* so as to render this stage responsive to the receipt of a pulse over this line. Thus considering stage *n*, the registration of a count in the preceding $(n-1)$ stage will have left the $B(n-1)$ relay operated so that its contact pair $B(n-1)2$ is closed. The next (negative) pulse appearing on line *p* therefore operates relay A*n* through rectifier MR2 and resistor R2, thereby registering a count in the *n*th stage and closing contacts A*n*1. On termination of the pulse the relay B*n*, the operating coil of which is shunted by a resistor R3, operates in series with relay A*n*. The B*n*1 contacts of relay B*n*, connected in the $(n-1)$ stage correspondingly to contacts $B(n+1)1$ in this *n*th stage, release the $A(n-1)$ relay in this preceding stage by short-circuit, with consequent release of the $B(n-1)$ relay on opening of the $A(n-1)1$ contacts. This disconnects the *n*th stage from the pulse line (contacts $B(b-1)2$ open). The B*n*2 contacts of the B*n* relay, connected in the next $(n+1)$ stage correspondingly to the contacts $B(n-1)2$ in the *n*th stage, connect this next stage to the pulse line. On registration of a count in the *n*th stage, therefore, the preceding stage is cleared and the next stage prepared to receive the next input pulse. On completion of the counting action the final count is represented by the particular stage in which the A relay is operated. This can be indicated by a second contact (typically A*n*2) of the A relay in the stage concerned: should a multiple indication be required, a slave reed relay S may be connected as shown, this relay operating and releasing with the A relay and controlling, for instance, four reed contact units.

In accordance with one embodiment of the invention it is contemplated in relation to FIG. 1 to provide and assemble the cross-point relays such as RL, the line circuit relays such as KA, KB, KK and the components of the gate circuits CG and PG, in modules which are compatible with each other and have a common modular dimension based on the dimensional requirements of a single cross-point relay.

Figures 3, 3A:
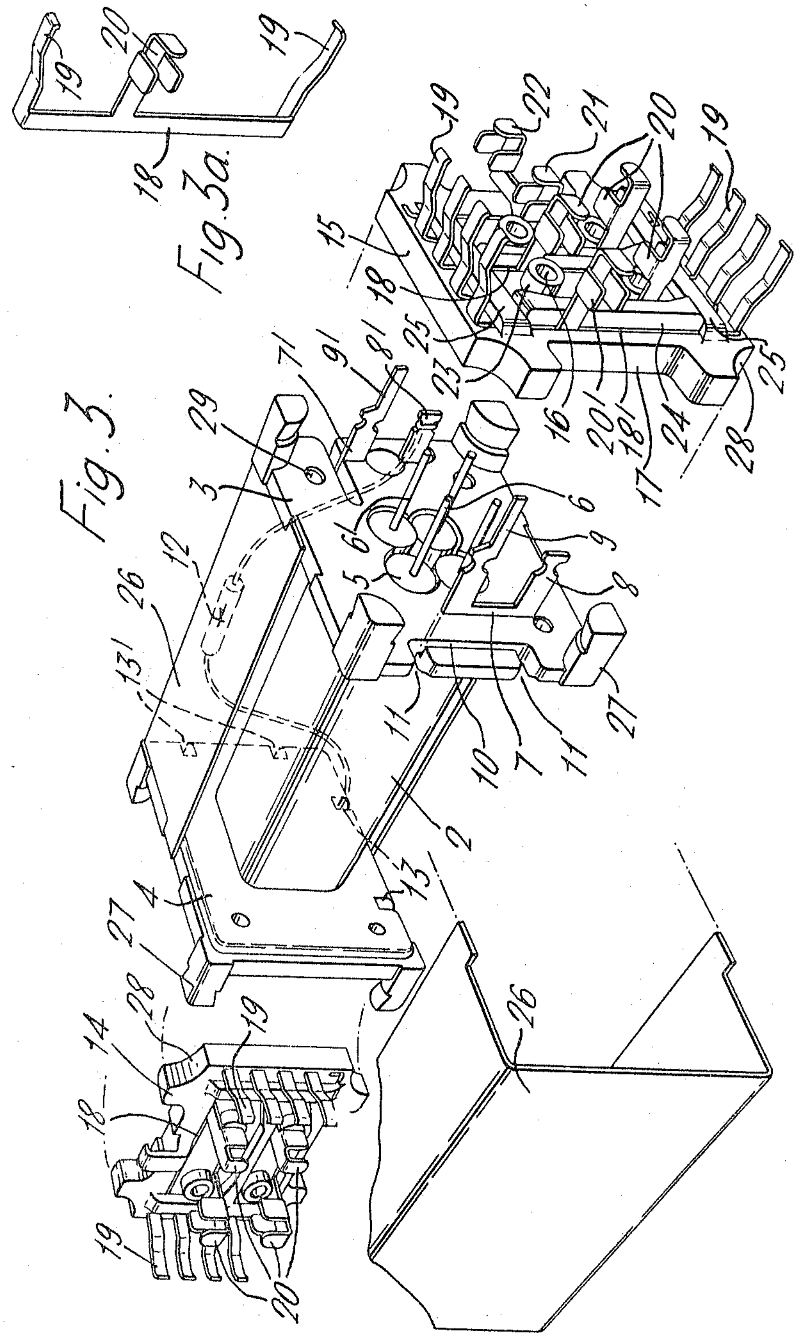
FIGS. 3 and 4 illustrate alternative forms of reed relay module suitable for cross-point relays, FIG. 3*a* showing one of the module end conductors separately.

A form of cross-point reed relay module is illustrated in FIG. 3. The relay operating coil (not shown) surrounds a hollow bobbin portion 2 of a module body structure between end cheeks 3 and 4. The hollow interior of the bobbin has a clover-leaf cross-section and accommodates four sealed magnetic reed contact units each comprising within an elongate sealed enclosure such as 5 a pair of magnetic reed contact elements having projecting terminal connections such as 6 at their opposite ends. Accommodated in the end cheeck 3 are two conductive links 7, 7′ having respective bollard projections 8, 8′ and respective terminal connections 9, 9′. These links are shown as being located in slots such as 10, into which they are heat-sealed as indicated by link 7′. Edge slots such as 11 in the end cheek 3 permit wire connections to be brought into the links 7, 7′ from the relay coil on the bobbin 2 and from a rectifier 12 mounted alongside the bobbin surrounding coil (not shown) within the transverse dimensions of the module as defined by the edge-to-edge dimensions of the end cheeks 3 and 4. (As a practical example these dimensions may each be 1″—or possibly somewhat smaller, for example .8″—using reed contact units of which the sealed enclosure has a length of about 1″; the length of the contact units determines, of course, not the transverse dimensions of the module but the minimum length of the bobbin structure 2.) In particular and in accordance with the connection requirements for the cross-point CP in FIG. 1, it is contemplated to connect one end of the relay coil to the bollard projection 8 of link 7, the other end of the coil and one terminal wire from rectifier 12 to the bollard projection 8′ and terminal connection 9′ of the link 7, and the other terminal wire of the rectifier to a similar link (not shown) carried by the end cheek 4 with wiring access thereto through edge slots 13 or 13′ depending on the required orientation of an end plate 14 at that end relatively to an end plate 15 at the other end.

The end plates 14 and 15, shown separated from the rest of the module, fit on to the end cheeks 4 and 3 respectively. Each end plate is formed with holes such as 16 to pass the reed terminal projections such as 6, and with edge cut-outs such as 17 to pass the projecting parts of the links such as 7. The end plates 14 and 15 each accommodate a number of transversely extending conductive members such as 18 (see FIG. 3*a*) formed at their ends, near opposite edges of the module, with outwardly extending tag portions 19. The outer extremities of the tag portions 19 overhang these edges. Consequently when a plurality of the modules are assembled side-by-side with the tag members such as 18 at one end of the modules in alignment, the tag portions 19 of these members at the abutting edges of two adjacent modules will themselves abut and can be therefore interconnected to form multiples extending across the face of the module assembly. The tag members such as 18 also have intermediate connecting tongues 20 which when the module is fully assembled lie alongside, and can therefore be connected to, the projecting terminal connections such as 6 from respective contact units. On the end plate 15 the connecting tongue 20' of a similar tag member 18' lies alongside the projecting terminal connection 9 of the link 7 for connection thereto in like manner. This same end plate also carries an additional transverse conductor having no end tag portions but having two connecting tongues 21 and 22 of which 21 lies alongside a remaining projecting terminal connection 6' from one of the contact units and 22 lies alongside the terminal connection 9' of the link 7'. This conductor and the link 7' thereby together interconnect one of the contact units with one end of the relay coil and one side of the rectifier 12 as required according to FIG. 1 (junction of RL, RL1, RF). To ensure adequate mutual insulation, the holes 16 by which the terminal connections extend through the end plates may be formed, as shown, through upstanding bosses 23, while the tag members 18 may be separated by upstanding barriers 24. The members 18 are shown as accommodated in the end plates in respective slots in which they are located by retaining bars 25 heat-sealed across them. Screening members 26 can be clipped in position as shown. Interconnection between the various projecting terminal connections and the corresponding connecting tongues can be established by dip-soldering actions performed first for one end of the module and then for the other end; preferably these actions are performed with a complete assembly of modules, as then all the modules in the assembly can be dip-soldered at the same time. The dip-soldering action will also solder together the abutting tags of adjacent modules.

The end cheeks 3 and 4 are formed at their corners with quadrantal projections such as 27 which are somewhat longer than the thickness of the end plates 14 and 15 so that when the end plates are applied (their corners being cut away as shown at 28 so as to avoid the projections 27) the projections 27 will project beyond their outer surfaces. With a number of modules assembled matrix-wise, the four quadrantal projections as each junction of four modules will form a circle over which a spring clip can be applied to hold the modules together. Further reference to this mode of assembly will be made later in connection with FIG. 5*a*. The bobbin structure 2 with its end cheeks 3 and 4 and also the end plates 14 and 15 are made from moulded plastics material. To assist in retaining the end plates on the end cheeks, the end plates may be formed on their undersides with spigots (not seen) which engage with a push-fit in corresponding holes such as 29 in the end cheeks.

Figure 4:
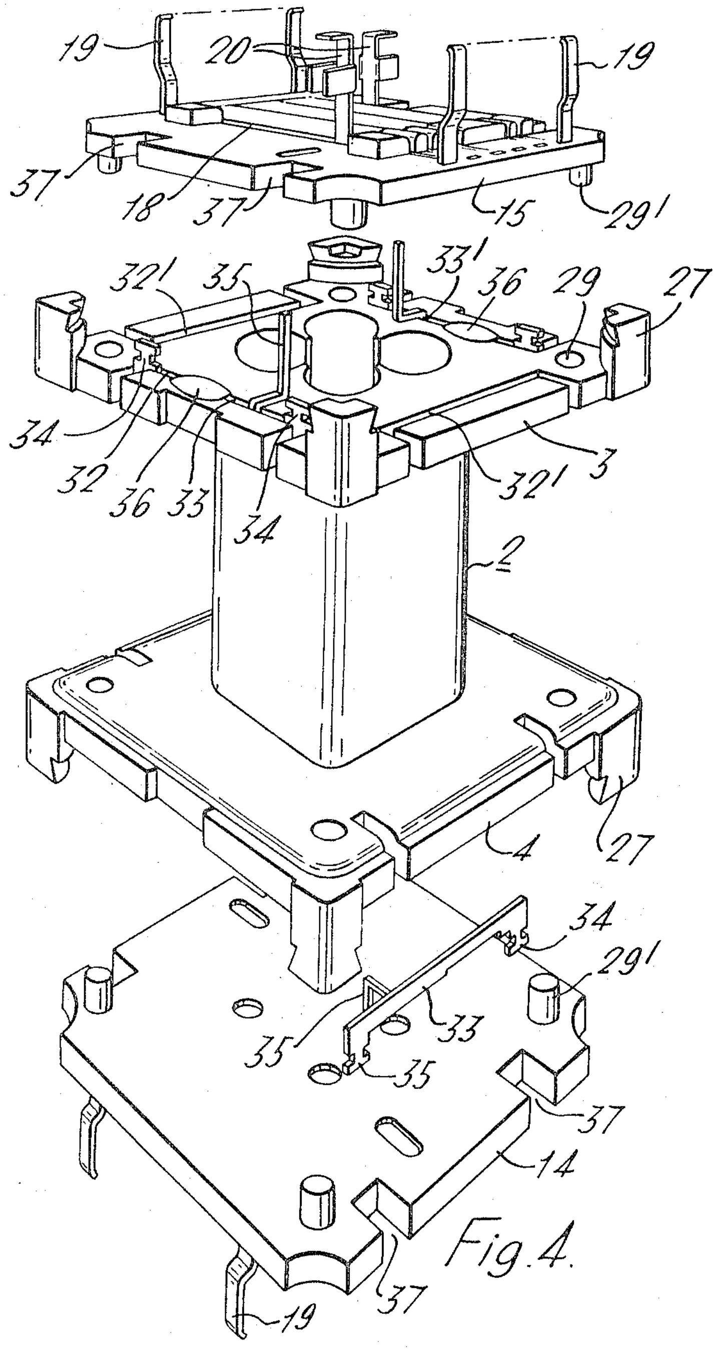

FIG. 4 is an exploded view of a modified form in which end plates 14 and 15 are again provided for both ends of the bobbin structure 2 and the end cheeks 3 and 4 of this structure again have quadrantal corner projections such as 27 for assembling a plurality of the modules together. The end plates are formed with spigots 29' which engage with a push-fit in corresponding holes such as 29 in the end cheeks. The end plates 14 and 15 are again formed with slots containing transverse tag members 18 (only two shown as typical at each end). These, as before, are formed with intermediate projecting tongue portions 20 for connections to projecting terminal connections of the contact units (omitted for the sake of clarity), and with end tag portions 19 overhanging opposite edges of the module for mating with corresponding tag portions of adjacent modules. As in FIG. 3 the flat of the tag portions 19 lies parallel to the edges which they overlap. However in either case these tag portions may instead lie normal to these edges so that mating tags overlap rather than abut. The end cheeks 3 and 4 carry in slots such as 32 in their outer surfaces respective connecting links such as 33 which differ from those (7) in FIG. 3 in that they have projecting bollards 34 and upstanding terminal projections 35. The links 33 are heat-sealed in position in their slots as indicated at 36, and the end plates have edge recesses such as 37 to accommodate the bollards 34 when the end plates are applied. The terminal projections 35 of these links 33 project alongside connecting tongues such as 20 of respective tag members 18 at opposite ends of the module: one of the bollards 34 of one of the links 33 at one end is connected to one end of the relay coil (not shown) and the other bollard of this member is connected to one side of the rectifier contained within the module. The link 33 at the other end has only the other end of the coil connected to it. In adapting this form of module for other functions as will be described later, additional link members such as 33' may be provided. Additional slots such as 32' in the end cheeks 3 and 4 permit repositioning of the links 33 (and 33' if provided) according to the required orientation of the end plates. Thus in FIGS. 3 and 4 the tag members 18 on the end plate 14 are shown as orthogonally disposed relatively to those on the other end plate 15, which disposition is adopted for the cross-point modules as these modules can then be assembled in a co-ordinate matrix with the tag members aligned along one co-ordinate at one face of the matrix and along the other ordinate at the other face. However for other applications a parallel rather than orthogonal disposition may be adopted if more convenient.

Reverting to FIG. 1, the line circuit relay KK requires two coils and two break-action contact pairs KK1 and KK2. The cross-point relay module of FIG. 3 or FIG. 4 can readily be adapted to constitute this line circuit relay. For this adaptation, instead of the module including four contact units within the bobbin structure as for the cross-point module, two of these contact units diametrically opposite each other in the bobbin interior are replaced by permanent magnet rods the flux from which biases the contacts in the two remaining contact units normally-closed. The bobbin is also provided with two coils instead of only one: in connecting the module in circuit it would be arranged that the flux produced by the coils when energised opposes that produced by the permanent magnets so as to overcome the permanent magnet bias and allow the contacts to open. The coil ends can be connected in this instance each to one of four link members such as 33 and 33'. Some modification may be required or possible as regards the number of tag members provided and the disposition of the connecting tongues thereon. Also on some of the tag members one or other of the end tag portions may have to be removed to isolate the tag member in question from an aligned tag member on an adjacent module where interconnection of the elements connected to such tag members in the two modules is not required: because the tag portions 31 are so shaped that their parts which overhang the edges of the module are offset outwardly with respect to their roots, this isolation can readily be achieved simply by cutting off the tag portions near their roots. A resistor to constitute resistance R4 in the line circuit of FIG. 1 may be included in the adapted line circuit module in a similar way as is the rectifier in the cross-point module.

The module of FIG. 3 or 4, adapted as just described to constitute the line circuit relay KK of FIG. 1, provides two break-action contact pairs jointly controlled by two coils. The switching system may elsewhere require two such break-action contact pairs individually controlled by respective coils and these may be provided by a module having the basic structure illustrated in FIG. 5. In this module, two bobbin structures 40 carrying respective coils such as 41 with screen members 42 each have end cheeks 43 and 44 which in the assembled module form part of composite end cheeks for the module as a whole. These composite end cheeks are completed by respective spacer members 45 which build the end cheeks up to the requisite modulus dimension and which like the bobbin structures are moulded from a suitable plastics material. The forms of the bobbin structure 40 and of the spacers 45 are shown separately in FIGS. 6 and 7. In the bobbin structure 40 the edges of the end cheeks which abut the edges of the spacers 45 are stepped in their thickness in one direction over one half of the length of the edge as shown at 47 (FIG. 6) and in the complementary direction over the other half of their length as at 48. The spacers 45 are correspondingly stepped in their thickness in each half of each edge, the stepping being complementary as between the two halves of each edge and as between each half of one edge and the corresponding half of the other edge. The stepped edges of the end cheeks 43 and 44 on the bobbin structure 40, and likewise the stepped edges of the spacers 45, are provided with complementary holes 49 and integrally moulded push-fit dowel pins 50 which cooperated in holding the parts together when assembled one with the other. (In fitting a spacer 45 as in FIG. 7 to the end cheeks 43 as in FIG. 6, the spacer has to be inverted as compared with its disposition in FIG. 7.) Slots 51 in the stepped edges of the spacers 45 co-operate with slots 52 in the edge of the end cheeks 43 and 44 to provide in the opposite end cheeks through holes which permit terminal connections (not shown) to pass through from the relay coils and from any other components that may be contained in the module between these end cheeks. In this particular module only some of the slots 51 in the spacers are thus used: the other slots are used in other forms of module in which spacers of the same form are employed as will be described later.

Reverting to FIG. 5, each bobbin structure 40 has a hollow interior with a bi-cuspid internal cross-section (shown at 46) in which can be accommodated a permanent magnet rod alongside a sealed magnetic reed contact unit. In this way the module will provide two reed contact units having respective normally-closed (break action) contact pairs individually connected by respective coils. As an alternative, by equipping one or each of the bobbin structures with two reed contact untits instead of a single contact unit and a magnet rod, this module can be adapted to provide two relays of which either one has two make action contact pairs and the other a single break action pair, or each has two make action pairs. This form of module structure can therefore be used to provide the two relays (A and B) of a counting circuit stage such as that shown in FIG. 2. For this latter purpose the module may additionally contain, in the space remaining available within the module, the other electrical components associated with these relays in the counting stage, namely the resistances R2 and R3 and the rectifier MR2. To this end these components may be mounted on a board, for instance in the manner shown in FIG. 10 for another variety of module to be described later. With the contact units and, when provided, the magnet rods inserted in the bobbin structures 40, end plates such as 53 are applied to the outside of the composite end cheeks at both ends of the module as shown in FIG. 5 for one end: the end plate for the other end has been omitted from this figure to reveal the underlying structure. As for the end plates in FIG. 3, the end plates such as 53 have spigots on their underside which co-operate with holes such as 29 to retain the end plates in position and also to hold together the several parts constituting the composite end cheeks. Quadrantal corner projections 54 and 55, projecting forwardly of the end plates as in FIGS. 3 to permit the module to be assembled with others, are here provided two on each of the end cheeks 43 and 44 of each bobbin structure 40. Each of the end plates such as 53 carries a plurality of transversely extending tag members which have projecting tag portions 56 at opposite edges of the end plates and intermediate projecting tongues 57 similar to those in FIGS. 3. Here again, the edge tag portions, rather than lying parallel to the edge so as to abut the tag portions on an adjacent module, may instead lie normally to the edge so as to overlap at their ends with the tag portions of an adjacent module. For compatibility all modules would have the same form of tag portions. The end plates 53 and 54 are of a "universal" design which can be used also in other forms of module to be described later. To this end, as shown in end view in FIG. *5a* for the end plate 53, the tag members 56' each have a number of regularly spaced connecting tongues 57 aligned with a corresponding array of openings 58 through the end plate. These openings in turn are aligned with the openings formed through the composite end cheeks (including the openings constituted by the open ends of the hollow bobbin interiors) so that terminal connections can project through the end plates for connection with the correspondingly positioned connecting tongues on the tag members. FIG. *5a* also shows the manner in which a plurality of modules can be assembled together side-by-side in rows and columns, with the tag members 56' aligned with and connecting to corresponding tag members in adjacent modules in the same row or column. It will be observed that where four adjacent modules meet, as at 59, the quandrantal projections 55 at the adjacent corners together constitute a circle over which a spring clip can be applied as indicated at 60 to hold the modules together.

Depending on the nature of the modules and the interconnections required between them, other assemblies may comprise only a row of modules having their tag members disposed transversely to the row rather than in alignment along it: the tag members then do not serve to effect direct connection between the modules but only present their tag portions along the edges of the row to facilitate external connection thereto.

Elsewhere in the switching system a single reed relay with either a single break-action contact pair or two make-action contact pairs may be required. This requirement can be met by a module having a basic structure as shown in FIG. 8. This structure is built up from one bobbin structure 40 of the form shown in FIG. 6 carrying an operating coil 41 and shield 42 as in FIG. 5, four spacers 45 of the form shown in FIG. 7, two at each end, two end plates such as 53 in FIG. 5 (only one being shown) and a frame member 60 again made of a moulder plastics material and having the form shown in FIG. 9. Referring to this latter figure, the frame member 60 comprises two side legs 61 joining two end sections 62 and 63 each having two quadrantal corner projections 64 corresponding to those (54, 55) on the bobbin structure 40. The edges of these end sections which abut the spacers 45 in the module of FIG. 8 are stepped in the same manner as are the corresponding edges on the end cheeks of the bobbin structure 40 and like them are formed with integral dowel pins 50 and holes 49. These stepped edges are also slotted as at 51 in the same manner as are the stepped edges of the spacer 45 of FIG. 7, these slots in the frame member 60 and in a spacer 45 assembled to it together constituting through holes in the composite end cheeks built up at each end of the module of FIG. 8 from the end cheek 43 or 44 of the bobbin structure 40, the two spacers 45 at that end, and the end section 62 or 63 of the frame member 60. The hollow interior 46 of the bobbin structure 40 will contain, as before, either a rod magnet along side a sealed reed contact unit or two such contact units alongside each other, giving either a single break-action contact pair or two make-action contact pairs. The remaining space within the module can again be utilised for containing additional components required for associated circuitry.

Turning now to FIG. 10, the module structure there shown, is again built up from a number of parts some of which are of the same form as in the module structures of FIG. 5 and FIG. 8: in particular it comprises a frame member 60 of the form shown in FIG. 9, four spacers 45 of the form shown in FIG. 7, and two end plates (only one shown) such as 53 in FIG. 5. The module structure is completed by two identical bobbin structures 65 having the form shown in FIG. 11 and assembled side-by-side with one reversed end to end relatively to the other. Referring to FIG. 11 each bobbin structure 65 has end cheeks 66 and 67 of which the edges which abut the adjacent spacer 45 in the completed module are stepped in their thickness as at 68 and 69 in complementary fashion relatively to each other and to respective halves of each stepped spacer edge. On their stepped edges the end cheeks 66 and 67 are also respectively formed with a dowel pin 50 and a dowel pin hole 49 corresponding to those similarly referenced in FIGS. 7 and 9. At the corner between two of the other edges such end cheek also have a quadrantal projection 70 so that, reverting to FIG. 10, there will be four quadrantal corner projections at each end of the complete module as before, namely one provided by each of the two bobbin structures 65 and two (64) provided by the frame member 60. Each bobbin structure 65 carries its own coil 71 with a screening member 72 and accommodates in its hollow interior 73 a single sealed reed contact unit (not shown).

As the module of FIG. 10 therefore provides two relays each having a single make-action contact pair, it can be used to provide the KA and KB relays required by the line circuit in FIG. 1. Moreover, the space remaining available within the module can be utilised to accommodate the circuit components associated with these relays, namely the resistance R1 and rectifier MR1. As shown in FIG. 10 these components R1 and MR1 can be mounted within the module on a mounting board 74 having terminal members such as 75 which project from it at opposite edges so as to pass through the composite end cheeks and end plates of the module for connection with terminal members on the end plates in the manner already indicated.

A module for containing only associated circuit components can be built up as shown in FIG. 12 from parts having certain of the forms already described. As can be seen, the module structure 80 of FIG. 12 comprises two frame members 60 of the form shown in FIG. 9 assembled at each end with three spacers 45 of the form shown in FIG. 7 and an end plate 53 of the form utilised by the modules of FIGS. 5, 8 and 10. (As will readily be appreciated, there are important economic and manufacturing advantages resulting from this ability to build up various forms of module structure from component parts which require to have only a relatively small number of different forms, such as those in FIGS. 6, 7, 9 and 11.) Within the module structure 80 is shown mounted a circuit board 81 having components 82 mounted thereon and connected according to requirements of external connection to terminal members 83 provided at opposite edges of the board 81 and projecting through the ends of the module to connect as before with tag members carried by the end plates 53. The circuit components 82 may, for instance, constitute one of the gating circuits, CG or PG, associated with the line circuit in FIG. 1, it being contemplated that the components for the other of these two gating circuits may likewise be mounted on another circuit board (not shown) accommodated within the same module parallel to the board 82 and spaced from it so that the terminal members on this second board pass through a different row of openings through the ends of the module. In general the board mounted components contained within a module of the form shown in FIG. 12 may comprise, according to requirements, such items as resistors, rectifiers, capacitors, transistors, ferrite cores, integrated thin film circuits and so on. Other ways of mounting components with the module are also possible: for instance as shown in FIG. 13 components 85 of a kind having fairly stiff terminal wires such as 86 projecting from opposite ends (as in the case of example of standard carbon resistor and small capacitors and rectifiers) may be mounted by means of their terminal wires between spaced strips 87 of insulating material folded so as to lie in successive layers such as 88, 89 within a volume such as to be containable within the internal volume of the module structure. At least some of the terminal wires project beyond the outer edges of the strips to such an extent and with such spacing that, with the successive layers arranged parallel to the rows of openings through the ends of the module, these terminal wires will project through these openings to connect with the terminal tags in the end plate as before. (It is to be noted that for clarity FIG. 13 has been drawn on a larger scale than FIG. 12.) Wires 90 running alongside the insulating strips 87 afford internal interconnection between the components, these wires being welded to the terminal wires which they cross and being cut away where interconnection is not required. As indicated at 91 it is possible to include in such an assembly of components items such as transistors having stiff terminal wires projecting at one end only. However such components may be more conveniently mounted on board and a module such as that of FIG. 12 may contain both board-mounted and strip-mounted components. The mounting boards and/or strips may additionally carry plain conductors providing direct cross-connections. Note for instance the conductor 92 in FIG. 13.

In a switching system for which the modules so far described are intended it may be necessary to employ for some functions reed relays of a larger size than that in relation to which the modular dimension is determined. For instance in a telephone switching system, while small-size reed relays are fully adequate for switching control and speech circuits operating with relatively low current levels, it may be necessary to employ larger sizes for switching heavier currents, for instance impulsing and ring currents, in order to ensure adequate contact life. In order to render such large reed relay compatible with the other modules, the arrangement shown in FIG. 14 can be adopted. In this figure a large reed relay is shown comprising a moulded bobbin structure which carries the relay's operating coil or coils 100 and a screen 101 between end cheeks 102 and 103. Within the bobbin structure is accommodated four large magnetic reed contact units 104, these units being for instance of the order of two inches long (excluding the projecting terminal ends 105 of the contacts) as compared with the one inch length of the smaller reed units. The external length of the bobbin structure is made equal to twice the unit modular dimension, and the edge-to-edge distance of its end cheeks is made equal to this dimension in one direction and equal to the basic module length in the direction at right angles. At each end is attached, side-ways on, a module structure 80 having the form shown in FIG. 12: both module structures 80 have end plates such as 53 as before but for convenience these have not been shown for the nearer of these two module structures. The end cheeks 102 and 103 of the relay bobbin structure have integrally moulded retention cleats 106 which engage over the adjacent side legs 61 of the frame members 60 of the module structures 80. The cleats 106 also serve to support terminal members such as 107 to which the coil ends are connected as indicated at 108 and which extend through the cleats and through the ends of the module structure 80 for connection as before to tag members carried by the end plates of the latter. Also extending through the ends of the module structures 80 and serving a similar purpose in respect of the reed contact units 104 are other terminal members 109 welded or otherwise connected to the terminal ends 105 of these contact units. The end cheeks 102 and 103 of the relay bobbin structure are formed on their edges with projections 110 of part-quadrantal form abutting the adjacent quadrantal corner projections on the module structures 80 and thereby permitting these structures to be retained in position against the end cheeks 102 and 103 by means of clips applied over the projections in like manner as before.

Should sub-circuit assemblies be required which cannot be contained within the width of a single module structure as in FIG. 12, it is contemplated that such as assembly may extend through two (or more) such module structures asembled side-byside (this being possible because the sides of the structure are open). Moreover by orientating the tag members in the end plates of these modules so that they are interconnected alignment, these tag members can provide transverse end connections extending across the width of the two or more modules. It is further contemplated, to the same end, to provide multiple-width module structures having composite end cheeks built up at least in part, under end plates of single module size, of double length spacers 111 of the form shown in FIG. 15. It will be seen that this spacer 111 is identical in each half of its length with the single length spacer 45 of FIG. 7 and indeed it is contemplated that, when double length spacers are to be provided, only such double length spacers will be made and the single length spacers 45 will be obtained simply by cutting in half. The way in which multiple-width modules can be built up as just mentioned is illustrated by FIG. 16 for a double width module and by FIG. 17 for a triple width module. These figures are end views with the end plates omitted. The module structure of FIG. 16 is built up from four frame members 60 (FIG. 9) together with three double length spacers 111 (FIG. 15) at each end. In the triple-width form (FIG. 17) there are six frame members 60 together with, at each end, three double length spacers 111 (FIG. 15) and three single length spacers 45 (FIG. 7) arranged in a staggered formation for stability. Likewise a quadruple-width module could be built up using a combination of single and double length spacers in staggered relationship at each end.

Another form of module which may be provided is illustrated in an exploded view in FIG. 18. This form again includes a plurality of reed contact units 112 but in this case they are disposed around a central, axially withdrawable, permanent magnet 113 enclosed in a moulded carrier formed of two identical interfitting parts 114. The magnetic field produced by the magnet holds the reed contacts normally closed: removal of the magnet allows the contacts to open. This form of circuit module (the contact units being in this case considered as circuit components) can therefore be used to establish, through the reed contacts, normal supply or other connections (e.g. signalling highways) which from time to time may require to be broken for testing purposes. These connections can then be broken simply by removal of the magnet, thereby eliminating the need for separately mounted test key switches and special wiring to them. The module body comprises two identical interfitting frame parts 115 each of modular width and half-modular depth. Each is formed with a pair of quadrantal corner projections 116, and as before end plates 117 are provided which fit on to the ends of the asembled module body frame. These end plates have holes 118 for passing the projecting terminal connections of the contact units and are slotted to receive transverse conductive members (not shown) extending to one or both edges of the module, where they are formed with upstanding tag portions compatible with those provided on the other forms of module. Each end plate 117 also has a large central opening 119 through which the magnet 113 in its carriage 114 can be inserted and withdrawn by means of a projecting lug portion 120 of the carriage. The carriage is located in position, when in the module, by means of a shoulder 121 and bevel-ended resilient leg portions 122, which engage with the end plates 117 at the outer periphery of their openings 119.

To illustrate the assembly of several varieties of module into a single assembly within a standard size of frame, FIG. 19 shows an arangement of modules providing the requisite line circuit components for a group of telephone subscribers lines having respective line circuits as illustrated in FIG. 1. In FIG. 18, in which each module is shown as a square with corner quadrants, representing an end view of the module, the modules K represent modules in the form described with reference to FIG. 10 each adapted to constitute the KA and KB relays of a line circuit according to FIG. 1; the modules KK represent modules in the form described with reference to FIG. 3 each adapted to constitute the KK relay of a line circuit according to FIG. 1; and the modules G represent modules in the form described with reference to FIG. 12 each providing the CG and PG gates associated with a line circuit according to FIG. 1. Each line circuit is therefore constituted by three modules such as K1, KK1, G1 for one line, K2, KK2, G2 for another line, and so on. The three modules for any line are arranged side-by-side with the K module at one side of the KK module and the G module at one of the orthogonal sides of the KK module: that is, the three modules are arranged in an L-shaped configuration with the KK module at the corner of the L. The several sets of modules for a group of line circuits 1, 2, 3 . . . 11, 12, 13 . . . are assembled together as shown so that the gate (G) modules all lie in one row. At the end of this row another module DA is provided, this being of the form shown in FIG. 12 and containing circuit components constituting a driving amplifier for the gate circuits. To complete the rectangular configuration of the module assembly dummy modules D are provided to fill in the corners alongside the amplifier module DA. The whole assembly is mounted in a frame F*x* (indicated schematically). Similar assemblies of modules for other groups of line circuits are likewise mounted in similar frames such as $F(x-1)$, $F(x+1)$ and all of these frames are mounted in a standard rack RK (also indicated only schematically). Driving pulses for the gates provided by the G modules in each assembly (being the pulses required to be fed to the gates over lead *p*1 in FIG. 1) are fed from the driving amplifier DA over a multipling connection *mp*1 constituted across one face of the assembly by a line of the transverse tag members carried by the gate modules (G) at that face and connected in each of these modules to the gate capacitors therein (compare FIG. 1). The gate rectifiers in each of these modules (again compare FIG. 1) are connected to respective transverse tag members at the other end of the module, where the tag members are orientated at right angles. The tag members concerned lie in alignment with and mate with corresponding tag members carried by the K and KK modules but not connected to any components therein. These aligned tag members in each frame such as F*x* are connected across the spaces between adjacent frames with the correspondingly aligned and mating tag members of the modules in the other frames, thus constituting connection multiples such as *mp*2 and *mp*3 corresponding to the pulse output lead *p*2 and *p*3 in FIG. 1. The last frame (F*n*) is shown as additionally including a row of modules RA each of which, being of the form shown in FIG. 12, contains the circuit components of two amplifiers having input connections which are connected in the module to transverse end tag members which are in alignment with, and thereby connected to, the connection multiples *mp*2 and *mp*3 respectively. The necessary connections to the K and KK modules and to the amplifiers can be made at the edges of the individual assemblies by wires which run along the space between adjacent frames and are connected to the tag portions presented at these edges by the tag members of the modules.

It is emphasized that the assembly arrangement just described is only exemplary and that many other arrangements are possible depending on the types and varieties of the modules concerned, the interconnections required between them, and the external connections required to be made to them.

What we claim is:

1. In a reed relay switching apparatus including an assembly of relay-type, circuit-type and combination-type modules, said relay-type module containing substantially only reed relay components, said circuit-type module containing only circuit components, and said combination-type module containing a combination of reed relay and circuit components, all of said modules being based on a common dimensional modulus whereby the assembled modules of different types are all dimensionally compatible with each other;

the invention wherein each of said modules comprises a molded body structure having end cheeks between which the module components are contained, said end cheeks having external upstanding quadrantal corner projections and at least some of said module components having terminal connections projecting through said end cheeks;

modularly dimensioned molded end plates fitted on the outer portions of said end cheeks between said corner projections, said end plates containing holes through which pass said projecting terminal connections; and transverse conductors carried by at least some of said end plates, each of said conductors extending to at least one edge of the end plate from a position of connection with one of said terminal connections, each conductor having at said one edge a tag portion upstanding from said end plate, the corner projections of said cheeks projecting beyond the outer surfaces of the end plates to form at the center of the square arrangement of four such modules a composite projection by means of which said modules may be held together.

2. A module assembly as claimed in claim 1, wherein the molded body structure of the relay-type module comprises a relay body part having integral end cheek and hollow bobbin portions;

at least one sealed reed contact unit contained within said bobbin portion; and at least one relay coil carried by said bobbin portion; said end cheek portions being of unit modular dimension in one direction and of fractional modular dimension in the other direction, each of said end cheek portions presenting two of the quadrantal corner projections for the body structure end cheeks; and further body parts providing end cheek portions of fractional modular dimension in said other direction, said further body parts being fitted to the relay part end cheek portions as extensions of their fractional dimensions to complete the composite end cheek of unit dimensions, said further body parts also presenting the remaining corner projections of the body structure end cheeks thus formed.

3. A module assembly as claimed in claim 2, including such relay modules having a reed contact unit and a permanent magnet alongside it within said hollow bobbin portion.

4. A module assembly as claimed in claim 2, wherein said relay modules include as such further body part another similar relay body part.

5. A module assembly as claimed in claim 2, wherein a pair of said relay-type modules are arranged in side-by-side relationship, said modules having end cheek portions effectively of half modular unit dimension in one direction and of fractional modular dimension in the other direction, said module pair being arranged with their half unit dimensions in additive relationship.

6. A module assembly as claimed in claim 2, wherein each relay module includes as such further body part a frame body comprising two end sections of unit modular dimension in one direction and of fractional modular dimension in the other direction; and two spaced side legs spaced apart in said one direction and integrally joining said end sections of the frame body, said end sections constituting end cheek portions forming part of the composite end cheeks and presenting two of said quadrantal corner projections.

7. A module assembly as defined in claim 1, wherein the molded body structures of certain modules include body parts having integral end cheek portions of fractional modular dimension in one direction, and other body parts assembled with such body parts and providing further end cheek portions of such fractional modular dimension in such direction as to complete for said structure composite end cheeks of unit modular dimension.

8. A module assembly as claimed in claim 7, wherein said end cheek portions of said body parts are of less than half unit dimension in said direction and the body structure includes spacer parts of fractional modular width assembled with the end cheek portions of the other body parts to complete the unit dimension of the composite end cheeks.

9. A module assembly as claimed in claim 8, including modules having such spacer parts of multiple modular length each forming part of a corresponding multiple number of modules assembled side-by-side.

10. A reed relay and circuit module assembly, comprising a set of molded body parts comprising relay body parts having respective hollow bobbin portions and integral end cheek portions for accommodating reed contact units within a surrounding coil, the end cheek portions of some of these parts constituting integral end cheeks having dimensions of unit modular length in both directions, spacer end cheek portions of unit modular length or a multiple thereof and of effective width which is a simple unit fraction of this unit length, the end cheek portions of others of said relay body parts having a dimension in one direction which is a multiple of said unit fraction but less than unit length, frame body parts comprising spaced side legs and joining end cheek portions which are of unit modular dimension in the direction in which said legs are spaced apart and of effective width equal to said unit fraction or a multiple thereof not more than half unit length, said parts permitting the construction of modules with differing body structures by selection and assembly of appropriate parts which, in the case of parts having end cheek portions of fractional modular dimension in one direction one selected so that as assembled together their end cheek portions together constitute a composite end cheeks of unit dimension in that direction, and end plate parts of unit modular dimensions able to be fitted on to the outsides of said integral and composite end cheeks of the body structures, said end plate parts and end cheeks having openings for passing therethrough projecting terminal connections from components contained within the completed modules.

11. A set of module body parts as claimed in claim 10, including interfitting parts having end cheek portions which are of fractional modular dimensions in one direction and unit modular dimension in the other direction, said end cheek portions having interfitting surfaces which over one half of the unit modular dimension have a form complementary to that over the other half, and in each half have a form which is one half of the thickness is complementary to the other half of the thickness.

References Cited

UNITED STATES PATENTS

| | | | |
|---|---|---|---|
| 2,821,669 | 1/1958 | Christian | 317—101 |
| 3,005,131 | 10/1961 | Melcher et al. | 317—101 |
| 3,128,356 | 4/1964 | Lychyk et al. | 335—151 X |

ROBERT K. SCHAEFER, *Primary Examiner.*

M. GINSBURG, *Assistant Examiner.*